United States Patent [19]

Barsky

[11] 3,758,530

[45] Sept. 11, 1973

[54] DIRECTED INTERESTERIFICATION OF GLYCERIDES OF FATTY ACIDS AND PRODUCTS THEREOF

[76] Inventor: George Barsky, 50 E. 41st St., New York, N.Y. 10017

[22] Filed: June 30, 1971

[21] Appl. No.: 158,617

[52] U.S. Cl............................ 260/410.7, 99/118 H
[51] Int. Cl............................ C11c 3/10, A23d 5/00
[58] Field of Search................................. 260/410.7

[56] References Cited
UNITED STATES PATENTS

| | | | |
|---|---|---|---|
| 3,410,881 | 11/1968 | Martin et al. | 260/404.8 |
| 3,492,130 | 1/1970 | Harwood | 99/118 |
| 3,431,116 | 3/1969 | Feuge et al. | 99/118 |
| 3,634,473 | 1/1972 | Hardwood | 260/410.7 |

Primary Examiner—Lewis Gotts
Assistant Examiner—Diana G. Rivers

[57] ABSTRACT

In fatty glycerides prepared by esterification of mixed fatty acids and glycerine, the fatty acid radicals are randomly distributed among the glycerine molecules. Random distribution occurs when natural glycerides or mixtures of natural or other glycerides are interesterified, for example, by the addition of sodium methylate. To make a glyceride of a specific or a non-random distribution of fatty acid radicals, elaborate and costly methods must be used. This invention discloses that by conducting interesterification under high pressure, the distribution of the fatty acid radicals can be directed away from the random.

7 Claims, No Drawings

DIRECTED INTERESTERIFICATION OF GLYCERIDES OF FATTY ACIDS AND PRODUCTS THEREOF

This invention is of a process for rearranging fatty acid radicals in triglycerides. More specifically the invention is of a method for directing to a substantial degree the distribution of various fatty acid radicals present in a fatty acid glyceride during the rearrangement procedure usually referred to as interesterification.

Interesterification is a process extensively practiced in the manufacture of products from glyceride fats and oils. There is an extensive literature in technical journals and many patents have issued on various modifications. A satisfactory review of the state of the art is given by Going in The Journal of the American Oil Chemists' Society, September 1967, Volume 44, pages 414A–455A.

It has been known for many years that the various fatty acid radicals in natural fats are not usually randomly distributed. A classical example is cacao butter which consists largely of glycerides having two saturated acid radicals and one unsaturated acid radical per molecule (one stearic, one palmitic and one oleic). The distinctive physical properties of cacao butter are due to this specific fatty acid distribution. If cacao butter is subjected to interchange by the addition of sodium methylate and warming, its physical character changes. It loses its solid form at room temperature and becomes a soupy mixture of solid and liquid fats. This is due to the fact that the positions of the fatty acid have been randomized and the material now contains trisaturated glycerides, tri-unsaturated glycerides, mixed glycerides of the two saturated and one unsaturated fatty acid; and mixed glycerides of the one saturated and two unsaturateds fatty acids. In other words, while the natural cacao butter consists largely of one glyceride, the randomized product contains at least four glyceridies of widely differing characteristics.

If cacao butter is saponified completely, the fatty acids recovered and esterified with glycerine, the product obtained is similar to the randomized product obtained by interchange.

In general although natural fats are not randomly distributed, they can easily be randomized. The randomizing of lard to improve its qualities as a shorting is a well-established industrial procedure. The randomizing may be complete or partial as desired. Interesterification usually takes place only in the liquid phase. It will give complete randomizing if allowed to proceed to equilibrium without interruption. Also interesterification may be modified or directed to some degree by operation at low enough temperature to crystallize out solid fats formed as the reaction proceeds. This directional effect is described by Eckey in U.S. Pat. No. 2,442,531 and is subsequent patents; also in Ind. and Eng. Chem. 40 1183–90 (1948).

Essentially it depends upon the removal from the reaction sphere of the solid fat that crystallized out and thus alteration of the composition of the reacting material, that is the liquid phase.

By such procedures it is possible to alter the physical characteristics of some fats, and, as Eckey has shown, make them more suitable for particular uses.

However, Eckey's process is cumbersome. In the first place, the reaction must be carried out at relatively low temperatures in order to crystallize out the solid fats and secondly, because of the low temperature it proceeds very slowly.

My modification of Eckey's process is the use of high pressure. This enables the process to be conducted at a higher temperature and therefore in much shorter time. The objection to using higher temperatures is that the saturated fats, which are normally solid become liquid and are soluble in the other, ordinarily liquid, fats. To compensate for this effect of temperature I conduct the operation at elevated pressures in the liquid phase. The result of the application of pressure is to cause the saturated fats to solidify at the higher temperature.

As an illustration of the counterbalancing of the two superimposed conditions, we have the fact that on interesterification with 0.1 percent sodium methylate dry cottonseed oil requires about 20 hours to come to equilibrium at 100°F. At 120°F, only ten minutes is required for the same ratio of sodium methylate. However, as Eckey has shown, temperatures of at least about 110°F for palm oil and for tallow and 90°F for cottonseed oil are required to alter appreciably the solid fat ratio in the final oil. But if the interesterification is carried out at 120°F, or 90°F with the above oils, no solid fat will be precipitated at atmospheric pressure. However, by subjecting the oil to a pressure in excess of 1,500 lbs. per square inch, preferably to a pressure of about 10,000 lbs. per sq. in. and temperatures above 100°F, I raise by about 30°F the temperature at which solid crystallizes out. Thus I can operate the Eckey process at higher temperatures and speed it up.

The imposition of pressures of the magnitude mentioned on liquid is not difficult nor does it consume large amounts of power. The operation can be conducted continuously in a pipe autoclave externally heated. Temperature gradients can easily be provided for by having sections of the autoclave jacketed separately. I provide for the addition of small amounts of water to kill the catalyst as the oil is discharged from the autoclave.

My process is very useful for the preparation of confectioner's hard butter from mixtures of coconut or lauric type and other oils such as soya or cottonseed. In this case it is desirable to retain the solid fats of the lauric oil relatively unchanged but to convert the liquid oils to solid fats. I do this by subjecting the mixed oil to high pressure at slightly elevated temperature and inject into the mixture the interesterification catalyst, which may be dissolved in a portion of the liquid oil. What happens is that the solid fats are crystallized and the liquid fats interesterify. In this process, the caproic, caprylic, and capric acids in the liquid fats are interesterified with the liquid portions of the modifying cottonseed or soya oil, and transformed into mixed glycerides containing oleic and linoleic acid radicals. Subsequent to the interesterfying step, the oil is hydrogenated and these liquids transformed to mixed caprylic or capric stearic glycerides which make excellent confectioner's hard butter constituents.

It has not been possible, heretofore to take a mixture of random glycerides containing, like cacao butter, approximately equimolecular equivalents of stearic, palmetic and oleic acid radicals to get substantially only a single glyceride.

In my process, however, the distribution of fatty acid radicals can be controlled by the application of high liquid pressure to the mixed glycerides while they are being interesterified. This is an application of le Chatelier's law which states that if a system in physical or chemical equilibrium is subjected to a stress, the state of the system will automatically tend to alter to undo the effect of the stress.

Thus if we take of randomized mixture of glycerides containing equimolecular amounts of stearic, palmitic and oleic acids, in the ratio found in cacao butter, and interesterify them under high pressure, the equilibrium composition will shift to the most dense glyceride, the mono-unsaturated disaturated glyceride. This is in conformity with the physical data available. Whymper (Chocolate and Cacao ; London 1921) gives the density of cacao butter as 0.8577 at 98°C and 0.8921 at 50°C. Interpolating, we find the density of cacao butter at 80°C to be 0.8715. Eckey (Vegetable Fats and Oils, Reinhold, 1954) gives the following densities at 80°C (p. 104):

| tripalmitic | 0.867 |
| tristearic | 0.863 |
| trioleic | 0.870. |

The calculated density for equal parts of the above three glycerides is 0.867.

Thus, at 80°C, cacao butter is more dense than any one of the triglycerides of its single component fatty acids and of course, more dense than that calculated for the mixture. Data are not available on the densities of di-unsaturated mono-saturated glycerides but the pressure effect on the trisaturated glycerides tends to cause reaction between the two.

In one modification of my process I take a dry, neutral, synthetic glyceride, the fatty acid radicals of which are approximately equimolecular amounts of stearic, palmitic and oleic acid, add 0.1 percent of sodium methylate, warm the oil to about 180°F and pump the oil through a pipe autoclave held at that temperature. The outlet of the pipe autoclave is restricted and the pressure of the liquid maintained at about 20,000 lbs. per square inch. Agitation is by means of ultrasonics. As the oil exits from the autoclave it is mixed with a small amount of water to deactivate the catalyst and cooled. The retention time in the autoclave at the high pressure is about 15 minutes. The wet product of the autoclave may be washed, dried, and bleached as is common practice in the vegetable oil industry. It is a hard fat, similar to cacao butter in appearance and melting characteristics. It may be hydrogenated partially if desired.

Instead of the synthetic glyceride mentioned above I may use a natural glyceride such as mutton tallow or palm oil or cottonseed oils. Hydrogenation to bring the iodine number down to about 40 is of advantage in the cases of palm and cottonseed. A mixture of equal parts of palm and cottonseed hydrogenated down to an iodine number of about 40 gives a good product.

There is sometimes a considerable variation in particular types of vegetable fats. This is probably due to differences in conditions at various locations where the plant is grown and the weather during different years. Therefore, it is necessary to establish by test the conditions of pressure and temperature required to obtain the properties desired in the product from the particular lot of oil or mixed oils.

One disadvantage of the high pressure is that the viscosity of the oil is increased by pressure, and this tends to slow down the reactions. To overcome this effect I provide for vigorous agitation of the oil. Especially effective for this operation is ultrasonic agitation.

I claim:

1. The improvement in processes of directed catalytic interesterification of mixtures of triglycerides differing in their melting points which consists in conducting the interesterification at pressures above 1,500 lbs. per square inch and temperatures above 100°F.

2. The improvement in processes of directed catalytic interesterification of mixtures of triglycerides differing in their melting points which consists in conducting the interesterification at pressures above 1,500 lbs. per square inch and temperatures above 100°F and deactivating the catalyst before or simultaneously with the release of the high pressure to prevent reversion.

3. The improvement in processes of directed catalystic interesterification of mixtures of triglycerides differing in their melting points which consists in conducting the interesterification at pressures above 1,500 lbs. per square inch and temperatures above 100°F but sufficiently low to permit the crystallization of solid triglycerides of low solubility as such triglycerides are formed at the pressures and temperatures used.

4. A non-randomized glyceride composition produced by interesterifying catalytically a mixture of triglycerides differing in their melting points by conducting the interesterifying at pressures above 1,500 lbs. per square inch and temperatures above 100°F.

5. A non-randomized glyceride composition produced by interesterifying catalytically a mixture of triglycerides differing in their melting points by conducting the interesterifying at pressures above 1,500 lbs. per square inch and temperatures above 100°F and neutralizing the catalyst before or simultaneously with the release of the high pressure to prevent reversion.

6. The method of reducing the amount of random rearrangement of fatty acid radicals in a natural fat during interesterification of the natural fat which comprises conducting the interesterification at pressures above 1,500 lbs. per square inch and temperatures above 100° F and under agitation in the presence of an interesterification catalyst and neutralizing the catalyst at or before the release of the reaction pressure.

7. The method of claim 6, in which the pressure is between 10,000 and 20,000 lbs. per square inch and the temperature above 100° F is the temperature at which the said fat is liquid.

* * * * *